S. Smyth, Revolving Gate.

No. 119,661.
Patented Oct. 3, 1871.

UNITED STATES PATENT OFFICE.

SAMUEL SMYTH, OF EAST BRIDGEWATER, PENNSYLVANIA.

IMPROVEMENT IN GATES.

Specification forming part of Letters Patent No. 119,661, dated October 3, 1871.

*To all whom it may concern:*

Be it known that I, SAMUEL SMYTH, of East Bridgewater, in the county of Susquehanna and State of Pennsylvania, have invented a new and Improved Revolving Carriage Gate; and I do hereby declare that the following is a full, clear, and exact description thereof, which will enable others skilled in the art to make and use the same, reference being had to the accompanying drawing forming part of this specification.

Figure 1:
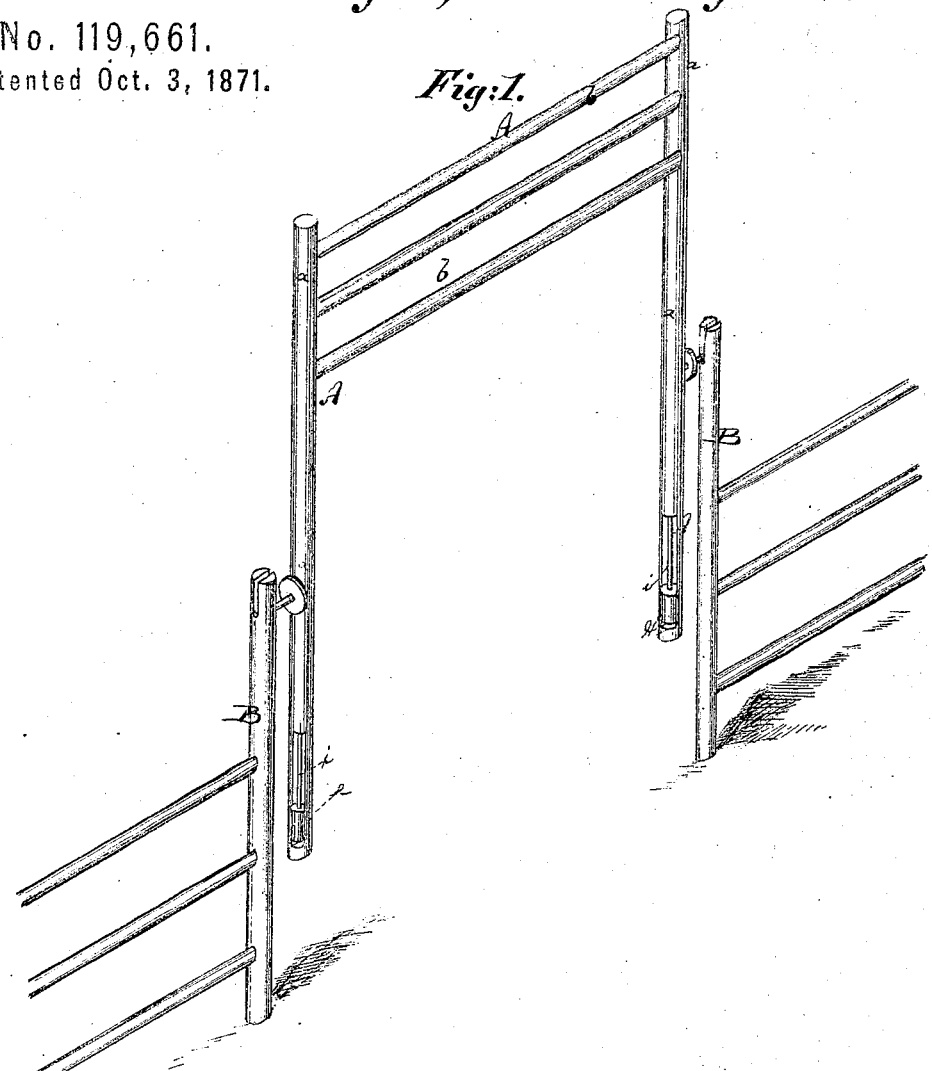
Figure 2:
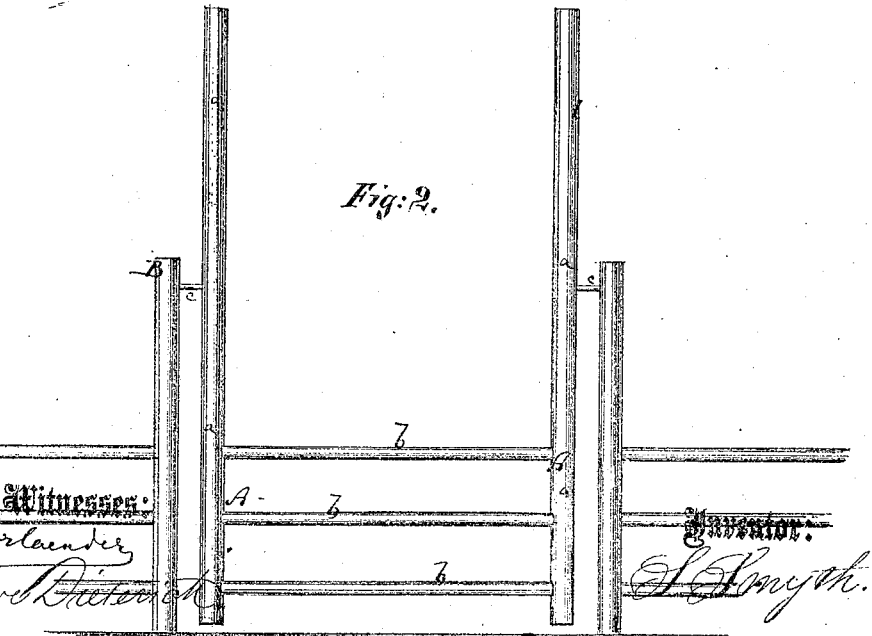

Figure 1 represents a perspective view of my improved carriage gate, showing it opened. Fig. 2 is a front view of the same, showing it closed.

Similar letters of reference indicate corresponding parts.

This invention relates to a new revolving balanced gate, to be arranged in fences at road crossings, &c., so as to be easily opened and closed. It consists in hanging the gate on horizontal projecting trunnions, and applying sliding weights to its upper end which balance the lower end, but overbalance it when the same is turned up. A very simple and convenient gate is thereby produced.

A in the drawing represents the gate. It consists of two upright side bars or poles, *a a*, connected by suitable cross-pieces *b b*, and is, by projecting trunnions *c c*, hung to the gate-posts B B. The trunnions project about from the middle of the poles *a*, which are about three times the height of the gate, so that when the gate is shut, as in Fig. 2, and extends to about three feet above ground, they will reach about six feet higher into the air, the trunnions being about a foot and a half above the gate. The free or unconnected ends of the poles *a a* are slotted or mortised, as shown in Fig. 1, and weights *e e* arranged to slide vertically therein on rods *i i*. These weights hang at the lower end of the slots when the gate is closed, as shown in Fig. 1.

When the gate is to be opened, it is swung on the pivots *c*, so as to be carried above the same. The weights will, during such motion, slide on their rods further away from the pivots, and thereby increase their effect on the gate, which they will hold elevated, as in Fig. 1. A slight effort will again restore the gate to the closed position.

The gate thus arranged is of very simple construction and easily operated.

Having thus described my invention, I claim as new and desire to secure by Letters Patent—

The revolving gate hung on trunnions, as described, and provided with sliding weights, in the manner specified.

SAMUEL SMYTH.

Witnesses:
  A. V. BRIESEN,
  T. B. MOSHER. (130)